United States Patent [19]

Specht

[11] 4,118,308

[45] Oct. 3, 1978

[54] METHOD OF RENEWING A POROUS DIAPHRAGM HAVING REDUCED PERMEABILITY TO ALKALI METAL CHLORIDE BRINES

[75] Inventor: Steven J. Specht, Cleveland, Tenn.

[73] Assignee: Olin Corporation, New Haven, Conn.

[21] Appl. No.: 862,308

[22] Filed: Dec. 20, 1977

[51] Int. Cl.$^2$ ............... C25B 13/08; C25B 13/04; C25B 15/00

[52] U.S. Cl. ................................. 204/296; 204/98; 204/128

[58] Field of Search ................. 204/98, 128, 296

[56] References Cited

U.S. PATENT DOCUMENTS

| | | | |
|---|---|---|---|
| 3,467,586 | 9/1969 | Grotheer et al. | 204/98 |
| 3,485,730 | 12/1969 | Virgil | 204/98 |
| 3,971,706 | 7/1976 | Hirozawa et al. | 204/98 |
| 3,988,223 | 10/1976 | Hirozawa | 204/98 |

FOREIGN PATENT DOCUMENTS 817,675  1/1975  Belgium.

*Primary Examiner*—R. L. Andrews
*Attorney, Agent, or Firm*—James B. Haglind; Donald F. Clements

[57] ABSTRACT

A method is provided for renewing the permeability of a porous diaphragm comprised of a synthetic fluorocarbon resin having ion exchange properties which comprises feeding an alkaline solution of an alkali metal chloride having a pH of from about 9 to about 12 to the anode compartment. A first portion of the alkaline brine passes through the porous diaphragm and a second portion contacts the porous diaphragm and is then removed from the anode compartment.

13 Claims, 1 Drawing Figure

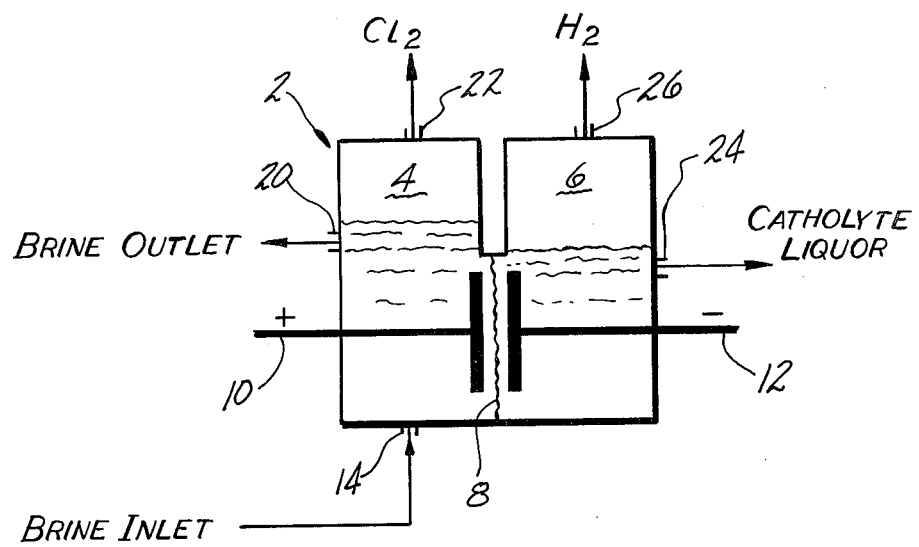

METHOD OF RENEWING A POROUS DIAPHRAGM HAVING REDUCED PERMEABILITY TO ALKALI METAL CHLORIDE BRINES

This invention relates to electrolytic diaphragm cells. More particularly, this invention relates to the renewing of porous diaphragms used in electrolytic cells.

During electrolysis of alkali metal chloride brines in an electrolytic cell employing a porous diaphragm, there occurs a deposition in the diaphragm of impurities found in the brine. Continued operation of the cell results in a build-up of these impurities, particularly calcium and magnesium hydroxides, in the diaphragm, to a point where the flow of brine through the diaphragm is seriously impeded. This reduced brine flow is accompanied by increased power consumption and reduced product output.

Known methods for treating plugged asbestos diaphragms include forcing an acidic solution through the diaphragm. This acidic solution removes the impurities and restores permeability to alkali metal chloride brines.

However, when using porous diaphragms of synthetic fluorocarbon resins having cation exchange properties, this procedure does not satisfactorily remove impurities trapped within the diaphragm.

It is therefore an object of the present invention to provide a method of renewing permeability to porous diaphragms of synthetic fluorocarbon resins.

It is a further object of the present invention to provide a method of renewing porous diaphragms which remove the deposit-forming impurities from the anode side of the diaphragm.

These and other objectives of the present invention are achieved in a method of renewing porous diaphragms comprised of synthetic fluorocarbon resins having cation exchange properties, the diaphragm having reduced permeability to alkali metal chloride brines in an electrolytic cell having an anode compartment, the porous diaphragm separating the anode compartment from the cathode compartment, the method which comprises feeding an alkaline solution of an alkali metal chloride having a pH of from about 9 to about 12 to the anode compartment, circulating the alkaline solution in the anode compartment such that a first portion of the alkaline solution passes through the porous diaphragm and a second portion of the alkaline solution contacts the porous diaphragm and is then removed from the anode compartment.

The accompanying FIGURE represents a schematic view of an electrolytic diaphragm cell used for employing the process of the present invention.

Diaphragm cell 2 is divided into an anode compartment 4 and a cathode compartment 6 by porous diaphragm 8. Anode 10 is located in anode compartment 4 and cathode 12 is positioned in cathode compartment 6. An alkaline alkali metal chloride brine is fed through inlet 14 into anode compartment 4. The alkaline brine contacts porous diaphragm 8, with a portion of the alkaline brine passing through porous diaphragm 8 into cathode compartment 6, the remainder of the alkaline brine being continuously removed through brine outlet 20. Diaphragm cell 2 has outlets 22, 24 and 26 for $Cl_2$, catholyte liquor and $H_2$ which are produced during the electrolysis process.

More in detail, during the operation of an electrolytic cell having a porous diaphragm comprised of a fluorocarbon resin having cation exchange properties, impurities in the brine fed to the anode compartment cause a build-up of deposits which decrease the permeability of the diaphragm to cations and to the brine itself. As a consequence of this loss of permeability, there is a decrease in current efficiency and an increase in cell voltage. Pluggage of the porous diaphragm is believed to be caused by the formation and build-up of insoluble hydroxides of elements such as Ca, Mg or Fe within the structure of the diaphragm.

To restore the permeability of the porous diaphragm it is necessary to remove these materials. As stated above, this is accomplished by contacting the porous resin diaphragm with an alkaline solution of an alkali metal chloride having a pH of from about 9 to about 12.

While the novel method of the present invention can be employed during the electrolysis process with the cell under the normal current load, it is preferable prior to feeding the alkaline brine to the anode compartment, to electrically disconnect the cell by turning off the current to the cell.

Where the brine fed to the anode compartment has a pH below about 5.0, it is replaced by the alkaline brine of the present invention.

While a first portion of the brine fed to the anode compartment will flow through the plugged porous diaphragm, it is sufficient that the second portion of the brine contact the surface of the diaphragm to restore the desired permeability of the diaphragm.

The anode compartment has an outlet which permits the second portion of the alkaline brine fed to the anode compartment to contact the surface of the diaphragm and be removed from the anode compartment without passing through the diaphragm. Impurities deposited in the porous diaphragm are thus removed from the anode side of the diaphragm with the second portion of brine. For example, permeability can be satisfactorily restored to a plugged porous fluorocarbon resin diaphragm when initially the first portion of alkaline brine passing through the diaphragm is a very small percent of the alkaline brine fed to the anode compartment. As the impurities deposited in the porous diaphragm are removed by the second portion, permeability of the porous diaphragm to the alkaline brine increases. When permeability has been restored to the porous diaphragm to the degree desired, the treatment can be discontinued and electrolysis resumed.

Any suitable feed rates for the alkaline alkali metal chloride brine to the anode compartment may be used. For example, alkaline brine feed rates of from about 0.1 to about 40.0, preferably from about 0.2 to about 20, and more preferably from about 0.5 to about 2 liters per minute per square meter of diaphragm surface area are quite satisfactory.

A positive pressure differential from the anode compartment to the cathode is maintained to assure that the first portion of alkaline brine passes through the porous diaphragm. Pressure differentials similar to those used during the electrolytic process are quite satisfactory. Suitable pressure differentials include those which are equivalent to a head level in the range of from about 7 to about 200, preferably from about 10 to about 100, and more preferably from about 15 to about 40 centimeters of brine.

Depending on the degree of permeability loss in the porous diaphragm, the alkaline brine purity, brine flow rate, and differential pressure all affect the treatment time required to restore permeability to a desired rate.

Less treatment time is required the higher the brine purity, and/or the higher the brine rate and/or the higher the differential pressure. Suitable treatment times include those from about 1 to about 500, preferably from about 5 to about 200, and more preferably from about 10 to about 50 hours.

The concentration of alkali metal chloride in the alkaline brine is not critical and any suitable concentration may be used, for example, alkaline solutions containing from about 150 to about 320 grams per liter of alkali metal chloride are quite satisfactory.

Any of the alkali metal chlorides may be used in the alkaline brines. Sodium chloride or potassium chloride are preferred for economic reasons.

It is desirable to limit deposit-forming impurities such as calcium, magnesium or iron compounds in the brine to concentrations less than about 5 parts per million and preferably less than about 1 part per million.

The alkaline brine fed to the anode compartment may be of any suitable temperature including those of from about 20° to about 100° C.

Porous fluorocarbon resin diaphragms whose permeability are restored by the method of the present invention include those composed of fluorocarbon resins having cation exchange properties. Examples are perfluorosulfonic acid resin diaphragms, perfluorocarboxylic acid resin diaphragms, composite diaphragms or chemically modified perfluorosulfonic acid or perfluorocarboxylic acid resins. Chemically modified resins include those substituted by groups including sulfonic acid, carboxylic acid, phosphoric acid, amides or sulfonamides. Composite diaphragms include those employing more than one layer of either the perfluorosulfonic or perfluorocarboxylic acid where there is a difference of equivalent weight or ion exchange capacity between at least two of the layers; or where the diaphragm is constructed of both the perfluorosulfonic acid and the perfluorocarboxylic acid resins.

One preferred porous diaphragm material is a perfluorosulfonic acid resin composed of a copolymer of a polyfluoroolefin with a sulfonated perfluorovinyl ether. The equivalent weight of the perfluorosulfonic acid resin is from about 900 to about 1600, and preferably from about 1100 to about 1500. The perfluorosulfonic acid resin may be supported by a polyfluoroolefin fabric. Perfluorosulfonic acid resin diaphragms sold commercially by E. I. duPont de Nemours and Company under the trademark "Nafion" are suitable examples of the preferred diaphragms.

Another preferred embodiment is a porous diaphragm comprised of a perfluorocarboxylic acid resin having an ion exchange capacity of up to 1.3 milliequivalents per gram, as produced by Asahi Glass Company.

Using the novel method of the present invention, porous diaphragms of fluorocarbon resins having reduced permeability can be readily restored to provide the desired permeability. The present method does not require special measures to protect the cathode during the renewing of the diaphragm as the alkaline brine used will not damage the cathode, but rather serves as a protective medium for it.

The following example is presented to further illustrate the invention without any intention of being limited thereby. All parts and percentages are by weight unless otherwise specified.

EXAMPLE

A diaphragm cell of the type illustrated in the FIGURE was operated employing a porous diaphragm comprised of a perfluorosulfonic acid resin film 7 mils thick having an equivalent weight of 1100 laminated to a fabric of polytetrafluoroethylene and sold by the E. I. duPont de Nemours and Company under the trademark "Nafion". After the cell had operated for a period of about 75 days, the catholyte flow rate was reduced to about 10 percent of the desired flow rate. The current to the cell was shut off and the diaphragm contacted with a sodium chloride brine having a pH of about 10.5 and a calcium content of about 1.5 parts per million. The alkaline brine, at a temperature of about 25° C. and having a NaCl concentration of about 300 grams per liter, was fed to the anolyte compartment at a rate of about 0.47 liters per minute per square meter of diaphragm surface area. A differential pressure between the anode compartment and the cathode compartment of about 30 centimeters of brine was maintained. The ratio of the first portion of the alkaline brine fed to the anode compartment which initially passed through the porous diaphragm to the second portion which circulated through the compartment and contacted the surface of the porous diaphragm was in the range of 0.05:0.95 to 0.25:0.75. This second portion was removed from the anode compartment through outlet 20 and discarded. The catholyte flow rate was monitored and after a period of 29 hours had returned to the desired flow rate. Feeding alkaline brine through the anode compartment was discontinued, the current turned on and the electrolysis process resumed.

What is claimed is:

1. A method of renewing a porous diaphragm comprised of a synthetic fluorocarbon resin having cation exchange properties, said porous diaphragm having reduced permeability to alkali metal chloride brines in an electrolytic cell having an anode compartment and a cathode compartment, said porous diaphragm separating said anode compartment from said cathode compartment, said method which comprises feeding an alkaline solution of an alkali metal chloride having a pH of from about 9 to about 12 to said anode compartment, circulating said alkaline solution in said anode compartment such that a first portion of said alkaline solution passes through said porous diaphragm and a second portion of said alkaline solution contacts said porous diaphragm and is then removed from said anode compartment.

2. The method of claim 1 in which said alkaline solution of said alkali metal chloride is fed to said anode compartment at a rate of from about 0.1 to about 40.0 liters per minute per square meter of diaphragm surface area.

3. The method of claim 2 in which a pressure differential from the anode compartment to the cathode compartment is maintained which is equivalent to a brine head level in the range of from about 7 to about 200 centimeters.

4. The method of claim 3 in which said alkaline brine is fed to said anode compartment for a period of from about 1 to about 500 hours.

5. The method of claim 4 in which said alkaline solution contains less than about 5 parts per million of deposit-forming impurities.

6. The method of claim 5 in which said synthetic fluorocarbon resin is a perfluorosulfonic acid resin comprised of a hydrolyzed copolymer of a perfluoroolefin and a fluorosulfonated perfluorovinyl ether of the formula $FSO_2CFRCF_2O[CFYCF_2O]_nCF=CF_2$ where R is a radical selected from the group consisting of fluorine and a perfluoroalkyl radical having from about 1 to about 9 carbon atoms; Y is a radical selected from the group consisting of fluorine and trifluoromethyl; and $n$ is an integer of 0 to about 3, said hydrolyzed copolymer having an equivalent weight of from about 900 to about 1600.

7. The method of claim 6 in which said R is a fluorine radical and said Y is a trifluoromethyl radical.

8. The method of claim 7 in which said hydrolyzed copolymer of said perfluoroolefin and said fluorosulfonated perfluorovinyl ether has an equivalent weight of from about 1100 to about 1500 and said hydrolyzed copolymer is reinforced by a polytetrafluoroethylene cloth.

9. The method of claim 5 in which said electrolytic cell is electrically disconnected.

10. A method of renewing a porous diaphragm comprised of a perfluorosulfonic acid resin, said porous diaphragm having reduced permeability to alkali metal chloride brines in an electrolytic cell having an anode compartment, a cathode compartment, said porous diaphragm separating said anode compartment from said cathode compartment, a positive differential pressure being maintained between said anode compartment and said cathode compartment, said method which comprises feeding an alkaline solution of an alkali metal chloride having a pH of from about 9 to about 12 to said anode compartment, circulating said alkaline solution in said anode compartment such that a first portion of said alkaline solution passes through said porous diaphragm and a second portion of said alkaline solution contacts said porous diaphragm and is then removed from said anode compartment.

11. The method of claim 10 in which said synthetic fluorocarbon resin is a perfluorosulfonic acid resin comprised of a hydrolyzed copolymer of a perfluoroolefin and a fluorosulfonated perfluorovinyl ether of the formula $FSO_2CFRCF_2O[CFYCF_2O]_nCF=CF_2$, where R is a radical selected from the group consisting of fluorine and a perfluoroalkyl radical having from about 1 to about 9 carbon atoms; Y is a radical selected from the group consisting of fluorine and trifluoromethyl; and $n$ is an integer of 0 to about 3, said hydrolyzed copolymer having an equivalent weight of from about 900 to about 1600.

12. The method of claim 11 in which said R is a fluorine radical and said Y is a trifluoromethyl radical.

13. The method of claim 12 in which said hydrolyzed copolymer of said perfluoroolefin and said fluorosulfonated perfluorovinyl ether has an equivalent weight of from about 1100 to about 1500 and said hydrolyzed copolymer is reinforced by a polytetrafluoroethylene cloth.

* * * * *